Patented Dec. 27, 1938

2,141,434

UNITED STATES PATENT OFFICE 2,141,434

PREPARATION OF CYANINE AND RELATED DYES

Frances Mary Hamer and Nellie Ivy Fisher, Harrow, England, assignors, by mesne assignments, to Eastman Kodak Company, Jersey City, N. J., a corporation of New Jersey No Drawing. Application March 19, 1936, Serial No. 69,724. In Great Britain March 21, 1935

11 Claims. (Cl. 260—240)

This invention has to do with the preparation of cyanine and related dyes.

It has hitherto been proposed, in preparing cyanine dyes, to condense various cyclammonium quaternary salts containing a reactive alkyl group with quaternary salts of quinoline, pyridine or other nitrogenous bases containing a reactive replaceable group such as iodine or alkylthio.

Now we have found that cyclammonium quaternary salts containing a reactive alkyl group can be condensed with quaternary salts of quinoline, pyridine or other nitrogenous bases containing a cyanogen group, to give cyanine dyes. We have further found that such cyano compounds can be condensed with compounds containing a reactive methylene group, to give dyes related to the cyanine dyes. When this reactive methylene group is in the nucleus of a heterocyclic compound, as it is for example in 3-ethylrhodanine and 2-ketodihydrothionaphthene, dyes (which one of us has proposed to name merocyanines) are obtained.

More specifically stated our invention consists in performing reactions between quaternary ammonium salts of cyclic bases having a reactive cyano group in the 4-position with quaternary cycloammonium salts having a reactive methyl group or with heterocyclic compounds having a reactive nuclear methylene group.

Our invention will be described by way of example with particular reference to the preparation of dyes from 4-cyano compounds, such as 4-cyanoquinoline alkiodides. The preparation of these particular 4-cyano compounds was described by Kaufmann in Ber. 51, 116 (1918). 4-cyanoquinoline compounds are of particular interest because the corresponding 4-iodoquinoline compounds are difficult to prepare.

Our invention is particularly applicable to the preparation of 4'-cyanine dyes. For example, 4-cyanoquinoline alkiodides can be condensed with quaternary salts of the following bases, to give 4'-cyanine dyes: quinaldine, β-naphthoquinaldine, lepidine, 1-methylbenzothiazole, the μ-methylnaphthothiazoles, 1-methylbenzoxazole, the μ-methylnaphthoxazoles, 1-methylbenzoselenazole, 2,3,3-trialkylindolenines and the like. All of these bases contain an alkyl group in the alpha or gamma position, i. e. one of the so-called reactive positions.

In many of the 4'-cyanine dye condensations employing 4-cyano compounds, the yields are markedly improved. For instance in preparing 1'-methyl-2-ethyl-thiaisocyanine iodide from 4-cyano quinoline methiodide and 1-methylbenzothiazole ethiodide, a yield of 35% of recrystallized dye is obtained (see Example 1), while Mills and Braunholtz, J. Chem. Soc. 121, 2006 (1922), only obtained a 13% yield of the crude diethyl analogue of this compound using the ordinary isocyanine dye condensation, i. e., with quinoline ethiodide and 1-methylbenzothiazole ethiodide. In still other cases, 4'-cyanine dyes heretofore unknown can be prepared, such dyes for example as indo-4'-cyanines and oxa-4'-cyanines.

Our new method, as applied to the preparation of 4'-cyanine dyes, may be called a modified ψ-cyanine condensation and allows of the preparation of 4'-cyanine dyes which could heretofore only be prepared by the isocyanine condensation. This is an advantage, since the yield in a ψ-cyanine condensation (with elimination of two molecules of acid) is, in general, better than that in an isocyanine condensation (with elimination of only one molecule of acid and of a molecule of hydrogen), where the course of the reaction is not so straightforward.

Among the compounds containing a reactive methylene group which can be condensed with cyano compounds, in accordance with our new process, are the following: rhodanines, such as ordinary unsubstituted rhodanine, 3-alkylrhodanines, 3-aralkylrhodanines, 3-arylrhodanines, barbituric acid, thiobarbituric acid, pyrazolones thiopyrazolones, 2-ketodihydrothionaphthenes, malonic acid, benzoylacetonitrile and the like. All of these compounds contain a nuclear methylene group adjacent to a nuclear carbonyl group, i. e. an oxocarbonyl or a thiocarbonyl. The condensation products of 4-cyano compounds and compounds containing a reactive methylene group are new.

The following examples serve to illustrate our invention. However, it is not intended that these examples limit our invention in any manner:

Example 1

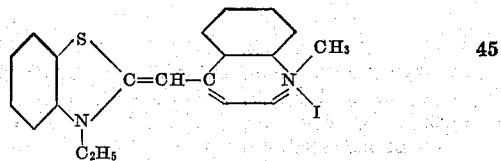

4-cyanoquinoline methiodide (5 parts) and 1-methylbenzthiazole ethiodide (5 parts) were boiled with absolute ethyl alcohol (70 parts), with mechanical stirring. Potassium hydroxide (2 parts) dissolved in absolute ethyl alcohol (30 parts), was added and boiling and stirring were continued for 15 minutes, during which time a red color developed and solid separated. When cold, this was filtered off and well washed with water and with ether. The yield of washed dye was 42% and, after recrystallization from methyl alcohol, 35%. This dye, which is 1'-methyl-2-ethyl-thiaisocyanine iodide, gives a pink alcoholic solution.

In a similar manner, 4-cyanoquinoline alkiodides can be condensed with 2,3,3-trimethyl-indolenine quaternary salts to give 1,1'-dialkyl-3,3-dimethylindo-4'-cyanine salts, or, 4-cyanoquinoline alkiodides can be condensed with 1-methylbenzoxazole quaternary salts to give oxa-4'-cyanine salts.

*Example 2*

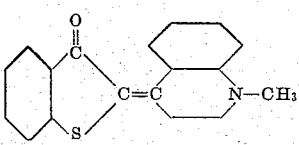

4-cyanquinoline methiodide (2 parts), 2-ketodihydrothionaphthene (1 part), anhydrous, finely-divided, potassium carbonate (2 parts) and absolute alcohol (30 parts) were boiled, with mechanical stirring, for 20 minutes. When cold, the product was filtered off and washed with water. It was treated with hot spirit and then with ammonia and was recrystallized from pyridine. The yields of crude and recrystallized dye were 47 and 18% of the theoretical value. Its alcoholic solution is purple.

*Example 3*

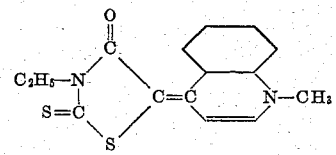

4-cyanquinoline methiodide (9 parts), 3-ethyl-rhodanine (5 parts), 180 mesh potassium carbonate (22 parts) and absolute alcohol (60 parts) were boiled with vigorous hand-stirring, for two minutes. The reaction mixture was treated with hot water (250 parts). When cold, the product was filtered off and well washed with water and then with a little acetone. It was treated with ammonia and recrystallized from pyridine. The yields of crude and recrystallized dye were 36 and 25% of the theoretical.

*Example 4*

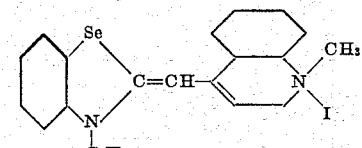

4-cyanquinoline methiodide (5 parts) and 1-methylbenzselenazole ethiodide (6 parts) and 180 mesh anhydrous potassium carbonate (3 parts) were boiled and stirred together with absolute alcohol (50 parts) for 15 minutes. The dye which crystallized was filtered off, thoroughly washed with water and with ether and recrystallized from methyl alcohol. A 35% yield of dye was obtained. This dye, which is 1'-methyl-2-ethylselenaisocyanine iodide, forms red and green pleochroic crystals and gives a pink alcoholic solution.

The above illustrated condensations can all be effected without the use of heat, but the reactions are very slow. Basic condensing agents other than potassium carbonate can be used. For example, strong organic bases, such as triethylamine or N-methylpiperidine, sodium carbonate or sodium hydroxide are satisfactory. Diluents other than absolute alcohol can be used. For example, absolute alcohol can be replaced by other lower aliphatic alcohols or other materials which do not adversely affect the condensations, such as pyridine. Where the basic condensing agent is liquid, the diluent can be dispensed with entirely.

Many of the hereindescribed dyes are useful as sensitizers for photographic emulsions, particularly gelatino-silver-halide emulsions.

What we claim as our invention and desire to be secured by Letters Patent of the United States is:

1. A process for preparing a dye comprising condensing, in the presence of a basic condensing agent, one molecular proportion of a 4-cyanoquinoline alkyl quaternary salt, with one molecular proportion of a cyclammonium alkyl quaternary salt containing a reactive alkyl group in a reactive position.

2. A process for preparing a dye comprising condensing, in the presence of a strong base condensing agent, one molecular proportion of a 4-cyanoquinoline alkyl quaternary salt, with one molecular proportion of a cyclammonium alkyl quaternary salt containing a reactive alkyl group in a reactive position.

3. A process for preparing a dye comprising condensing, in the presence of a strong base condensing agent, one molecular proportion of a 4-cyanoquinoline alkyl quaternary salt with one molecular proportion of a cyclammonium alkyl quarternary salt containing a reactive methyl group in a reactive position.

4. A process for preparing a dye comprising condensing, in the presence of a strong base condensing agent, one molecular proportion of a 4-cyanoquinoline alkiodide with one molecular proportion of a cyclammonium alkyl quaternary salt containing a reactive alkyl group in a reactive position.

5. A process for preparing a dye comprising condensing, in the presence of a strong base condensing agent, one molecular proportion of a 4-cyanoquinoline alkiodide with one molecular proportion of an azole alkyl quaternary salt having a reactive alkyl group in the alpha position.

6. A process for preparing a dye comprising condensing, in the presence of a strong base condensing agent, one molecular proportion of a 4-cyanoquinoline alkiodide with one molecular proportion of an azole alkyl quaternary salt having a reactive methyl group in the alpha position.

7. A process for preparing a dye comprising condensing, in the presence of a strong base condensing agent, one molecular proportion of a 4-cyanoquinoline alkiodide with one molecular proportion of an oxazole alkyl quaternary salt having a reactive methyl group in the alpha position.

8. A process for preparing a dye comprising condensing, in the presence of a strong base condensing agent, one molecular proportion of a 4-cyanoquinoline alkiodide with one molecular proportion of a 1-methylbenzoxazole alkyl quaternary salt.

9. A process for preparing a dye comprising condensing, in the presence of a strong base condensing agent, one molecular proportion of a 4-cyanoquinoline alkiodide with one molecular proportion of a 1-methylbenzoxazole alkiodide.

10. A process for preparing a dye comprising condensing, in the presence of a strong base condensing agent, one molecular proportion of a 4-cyanoquinoline alkiodide with one molecular proportion of a 2,3,3-trimethylindolenine alkyl quaternary salt.

11. A process for preparing a dye comprising condensing, in the presence of a strong base condensing agent, one molecular proportion of a 4-cyanoquinoline alkiodide with one molecular proportion of a 2,3,3-trimethylindolenine alkiodide.

FRANCES MARY HAMER.
NELLIE IVY FISHER.